US012327965B2

(12) United States Patent
Ladstätter

(10) Patent No.: US 12,327,965 B2
(45) Date of Patent: Jun. 10, 2025

(54) CONTACTING ELEMENT FOR CONNECTING TO A MOUNTING RAIL

(71) Applicant: ZUMTOBEL LIGHTING GMBH, Dornbirn (AT)

(72) Inventor: Gerald Ladstätter, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 17/795,920

(22) PCT Filed: Nov. 25, 2021

(86) PCT No.: PCT/EP2021/082946
§ 371 (c)(1),
(2) Date: Jul. 28, 2022

(87) PCT Pub. No.: WO2022/223142
PCT Pub. Date: Oct. 27, 2022

(65) Prior Publication Data
US 2024/0297466 A1 Sep. 5, 2024

(30) Foreign Application Priority Data
Apr. 23, 2021 (DE) ..................... 10 2021 110 389.4

(51) Int. Cl.
*H01R 25/14* (2006.01)
*F21V 21/35* (2006.01)
*F21V 23/06* (2006.01)

(52) U.S. Cl.
CPC ........... *H01R 25/142* (2013.01); *F21V 21/35* (2013.01); *F21V 23/06* (2013.01)

(58) Field of Classification Search
CPC ....... H01R 25/142; H01R 29/00; F21V 21/35; F21V 23/06
See application file for complete search history.

(56) References Cited

U.S. PATENT DOCUMENTS 8,888,512 B2 * 11/2014 Hoffmeister ......... H01R 25/142 439/121
10,505,296 B1 12/2019 Huang
(Continued)

FOREIGN PATENT DOCUMENTS

DE 695394 C * 8/1940 ............. H01R 25/14
DE 197 06 865 A1 8/1998
(Continued)

OTHER PUBLICATIONS

PCT/EP2021/082946, International Search Report and Written Opinion, 14 pages, Feb. 22, 2022.

*Primary Examiner* — Abdullah A Riyami
*Assistant Examiner* — Nelson R. Burgos-Guntin
(74) *Attorney, Agent, or Firm* — Andrus Intellectual Property Law, LLP

(57) ABSTRACT

A contacting element (10, 40) for connecting a luminaire or an electrical unit to a mounting rail has a contact holding body (15, 41) with a plurality of connecting contacts ($\mathbf{20}_1$, $\mathbf{20}_2$, $\mathbf{30}_1$, $\mathbf{30}_2$), said contact holding body being adjustable between an open position and a contacting position, wherein at least two connecting contacts ($\mathbf{20}_1$, $\mathbf{20}_2$, $\mathbf{30}_1$, $\mathbf{30}_2$) are arranged adjustably on the contact holding body (15, 41), and wherein at least two of the adjustable connecting contacts ($\mathbf{20}_1$, $\mathbf{20}_2$, $\mathbf{30}_1$, $\mathbf{30}_2$) are combined into a group and mounted on the contact holding body (15, 41) in such a way that they are only adjustable with respect to the contact holding body (15, 41) in a fixed relation to one another.

15 Claims, 7 Drawing Sheets

(56) References Cited

U.S. PATENT DOCUMENTS

| | | | | |
|---|---|---|---|---|
| 2007/0015388 | A1* | 1/2007 | Boike | H01R 33/945 439/121 |
| 2018/0069359 | A1* | 3/2018 | Müller | H01R 9/2658 |
| 2018/0323560 | A1* | 11/2018 | Wynnik | H02G 5/025 |
| 2023/0349541 | A1* | 11/2023 | Hierzer | F21V 23/06 |

FOREIGN PATENT DOCUMENTS

| | | | | | |
|---|---|---|---|---|---|
| DE | 103 19 510 | A1 | | 11/2004 | |
| EP | 2113971 | A1 | * | 11/2009 | H01R 13/518 |
| EP | 2133971 | A1 | | 11/2009 | |
| EP | 2287978 | A1 | * | 2/2011 | H01R 25/14 |
| WO | 2022223732 | A1 | | 10/2022 | |

* cited by examiner

CONTACTING ELEMENT FOR CONNECTING TO A MOUNTING RAIL

CROSS-REFERENCE TO RELATED APPLICATION

The present application is the U.S. national stage application of international application PCT/EP2021/082946 filed Nov. 25, 2021. The international application claims priority to German Patent Application 10 2021 110 389.4 filed Apr. 23, 2021.

TECHNICAL FIELD OF THE INVENTION

The present invention relates to a contacting element, which is used to connect a luminaire or an electrical unit to a mounting rail. In particular, the contacting element is provided to connect luminaires or electrical units to mounting rails having a mounting rail profile with at least one busbar, arranged therein, with electrically contactable conductors, wherein the contacting element has a plurality of connecting contacts which are adjustable in order to be able to make a selection of the conductors to be contacted of the busbar(s).

BACKGROUND OF THE INVENTION

Mounting rail systems with an elongate mounting profile rail as well as a busbar held in the mounting profile rail are known from the prior art and are used, for example, to implement elongate so-called light strip systems. A known light strip system is sold by the Applicant under the name "TECTON" and is characterized in that luminaires or other electrical units can be flexibly positioned on the mounting rail over the entire length of the system. This is made possible in that, due to a special mounting of the conductors of the busbar(s), the latter are accessible to the consumers over the substantially entire length of the light strip system so that contacting of the conductors can take place not only at fixedly predetermined positions but rather at any desired location. Such an active light strip system is shown in WO 2001/091250 A1, for example.

In the "TECTON" system mentioned above, two busbars are arranged opposite one another on the two side walls of a U-shaped mounting profile rail that is open downward. The contacting of the conductors of these two busbars then takes place in that the luminaire or, in general, the consumer to be connected has a rotatable contacting element, which is inserted from the bottom side via the elongate coupling opening of the mounting profile rail into the latter and subsequently rotated by about 45°. Here, contacts arranged on the contacting element are designed in such a way that they are laterally pivoted outward by the rotation of the contacting element and ultimately contact the conductors of the busbars in the rotated state. In addition, a mechanical locking also takes place simultaneously so that the luminaire or the consumer is reliably fixed to the mounting rail.

At least a part of the contacts of the known contacting element is adjustable here. This is achieved by the contacting element having a contact holding body which serves to hold the various contacts, wherein at least a part of the contacts are mounted on the contact holding body in a height-adjustable manner or can be arranged at different heights on the contact holding body. The possibility of different height positioning of individual contacts results here in that they can be selected to specifically contact specific conductors of the busbar(s). In this way, for example, there is the possibility of selectively selecting individual phases of a power supply network for contacting by the luminaire or the electrical unit.

Modern mounting rail systems have an increasing number of internally running electrical conductors, through which the functionality of the thus implementable system can be extended. In addition to the possibility of providing special emergency power supply circuits, via which at least a part of the luminaires can still be powered in case of an emergency state, in addition to the general power supply, additional conductors are also used to transmit data or signals. This data transmission can then be used, for example, to control the individual connected luminaires from a control center by means of digital commands. Moreover, in the meantime, however, it is also provided, for example, to use individual conductors of the busbar, independently of a lighting controller, for the transmission of signals used otherwise. For example, conductors could be used within the framework of using 100V voltage to transmit digital acoustic signals, so that speakers or other suitable devices for playing back the acoustic information can then be connected to the corresponding pair of conductors. The use of conductors for signal transmission within the framework of a powerline carrier method in order to use at least a portion of the conductors of the busbar as a communication network for general information transmission would also be conceivable.

However, the extension of the functionality of such systems has the consequence that a variety of contacting possibilities exist for the contacting of the busbar(s) by luminaires or other electrical units and the connecting contacts must be positioned accordingly in a suitable manner. In so doing, it must be ensured that erroneous arrangements of the connecting contacts are avoided in order to reduce the risk of incorrect contacting. In extreme cases, undesirable short circuits could occur, which could result in damage to individual or multiple components of the system.

At the same time, however, the effort required to correspondingly contact the conductors should be kept as low as possible. The object of the present invention is to offer an improved solution in this respect.

SUMMARY OF THE INVENTION

The object is achieved by a contacting element having the features of claim 1. Advantageous developments of the invention are the subject matter of the dependent claims.

The solution according to the invention is based on a corresponding pairing of at least two connecting contacts of the contacting element. The basis for this is a corresponding arrangement of the conductors of circuits as well as the fact that two specific conductors of the busbar(s) generally have to be contacted in order to use a specific functionality. In that the paired connecting contacts are arranged in such a way that they are only adjustable with respect to a contact holding body of the contacting element in a fixed relation to one another, it is ensured that two conductors of the busbar(s) associated with one another are always contacted by this pair of connecting contacts. At the same time, in addition to increased safety in adjusting the contacting options, it is ensured that the effort required to arrange the connecting contacts in the correct position is reduced.

According to the present invention, a contacting element for connecting a luminaire or another electrical unit to a mounting rail, which has a mounting rail profile with at least one busbar, arranged therein, with electrically contactable conductors, is proposed, wherein the contacting element has a contact holding body having a plurality of connecting contacts, which contact holding body is adjustable between an open position, in which an insertion and removal of the contacting element from the mounting rail profile is possible, and a contacting position, in which the connecting contacts contact conductors of the busbar, and wherein at least two connecting contacts are arranged adjustably on the contact holding body. According to the invention, it is provided here that at least two of the connecting contacts arranged on the contact holding body are combined into a group and mounted on the contact holding body in such a way that they are only adjustable with respect to the contact holding body in a fixed relation to one another.

The pairing according to the invention of two connecting contacts is in particular useful for using the contacts to contact conductors that are always present in pairs in order to provide a specific functionality. In this respect, conductors that are used, for example, according to the so-called DALI standard for the transmission of information for lighting control are in particular conceivable. Conductors for transmitting digital signals for speakers, cameras, or the like, or in general for data communication, could also be contacted in this way in a simple and elegant manner. In contrast, the solution is less suited for a classical phase selection when contacting power supply lines, since one of the connecting contacts here generally has to contact a fixedly predetermined conductor, namely the neutral conductor, whereas the second connecting contact is to variably tap one of the three phase conductors. Nevertheless, in particular in more complex systems that provide a variety of different functionalities, the manner of contacting can be made easier and safer.

Of course, according to an advantageous development of the invention, the contacting element could also have a plurality of groups of combined connecting contacts. In this case, it can in particular be provided that a group respectively has two connecting contacts.

The contact holding body of the contacting element according to the invention can in particular be rotatable about a pivot axis, wherein the connecting contacts are then arranged on the contact holding body in such a way that the connecting contacts are pivoted outward by a rotation of the contact holding body and are brought into abutment against the conductors to be contacted. In this case, the adjustable connecting contacts are mounted on the contact holding body so as to be displaceable in parallel to the pivot axis, wherein it can in particular be provided that the two connecting contacts of a group are arranged opposite one another with respect to the pivot axis, preferably substantially in a common plane aligned perpendicularly to the pivot axis. In this case, the paired connecting contacts are thus basically always arranged at the same height on the contact holding body so that the associated conductors are easily correctly contacted when the conductors of the busbar or busbars are correspondingly configured.

The connecting contacts of a group are preferably arranged adjustably on the outer circumference of the contact holding body. In particular, the connecting contacts of a group may be arranged on a shared contact holding part, which is then displaced in a corresponding manner in order to position the connecting contacts correctly.

A further advantageous option is to arrange the adjustable paired connecting contacts on an adapter that is attached to the contact holding body. In particular, the connecting contacts can be fixedly arranged on the adapter and the adapter itself can be mounted adjustably on the contact holding body. In order to correctly position the connecting contacts, only the corresponding adapter has to be displaced appropriately with respect to the contact holding body.

As already mentioned, it is generally provided that a consumer to be connected to the system or, in general, a luminaire or an electrical unit contacts not only the conductors used for transmitting signals but also conductors intended for supplying power. Since at least one of the conductors generally has a fixed position, it can additionally be provided according to an advantageous development that the contacting element according to the invention has at least one individually adjustable and/or one non-adjustable further connecting contact. These two contacts can then in particular be used for contacting power supply lines, including an associated phase selection. In this case, it is preferably then again provided that the individually adjustable or the non-adjustable further connecting contact is arranged on the contact holding body.

According to the present invention, a luminaire or electrical unit is also proposed for connection to a mounting rail comprising a mounting rail profile with at least one busbar, arranged therein, with electrically contactable conductors, wherein according to the present invention, the luminaire or electrical unit has at least one contacting element as described above.

BRIEF DESCRIPTION OF THE DRAWINGS

The invention is explained in more detail below with reference to the accompanying drawing. The figures show.

DETAILED DESCRIPTION OF THE PREFERRED EMBODIMENT

Figure 6:
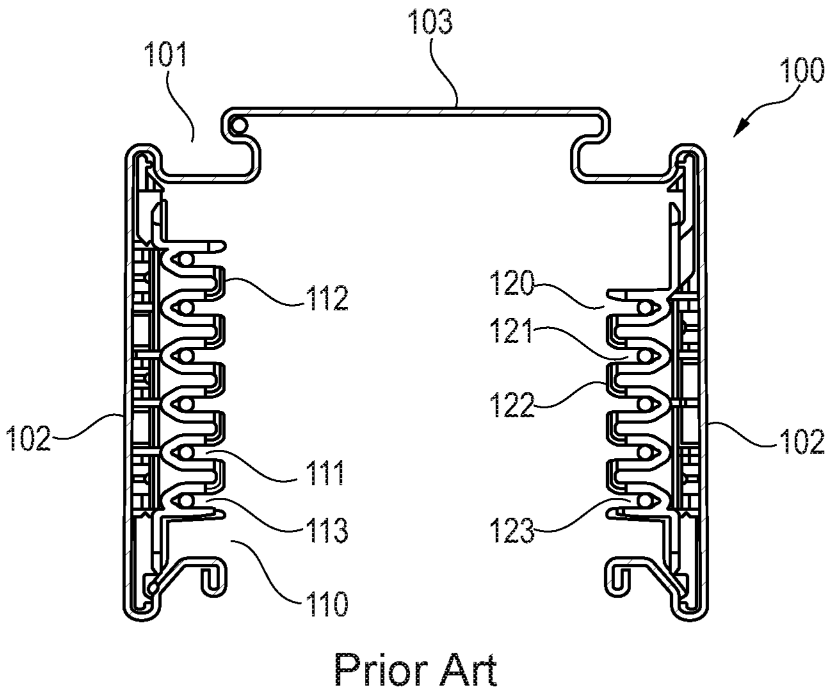
Prior Art Fig. 6
FIGS. 6-9 are views of a mounting rail system with a contacting element according to the prior art.
Figure 7:
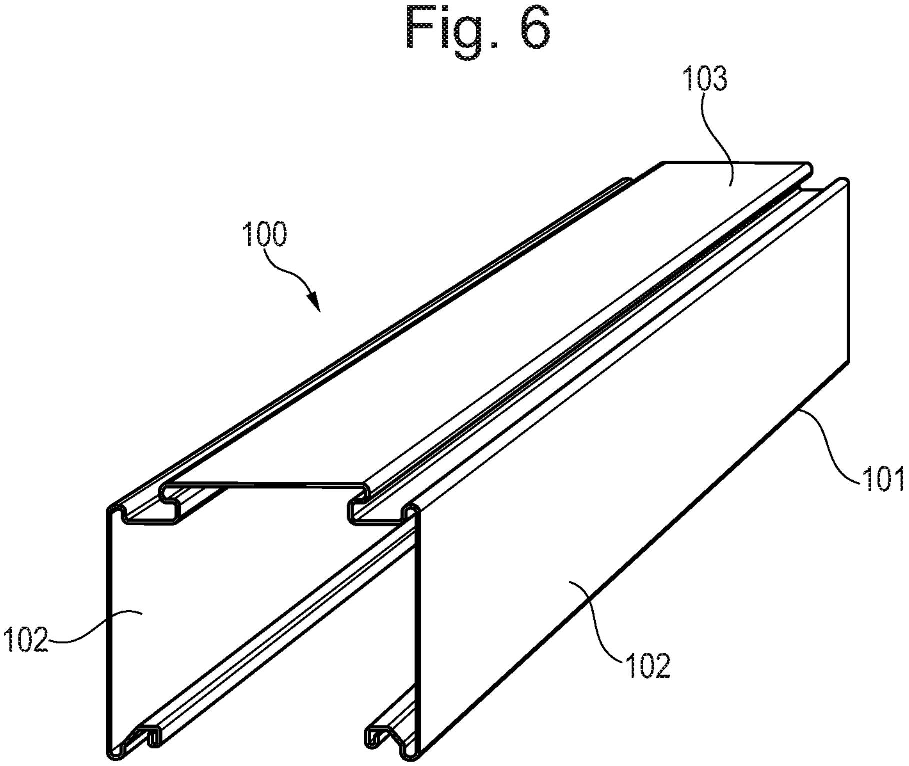
Prior Art Fig. 7
Figure 8:
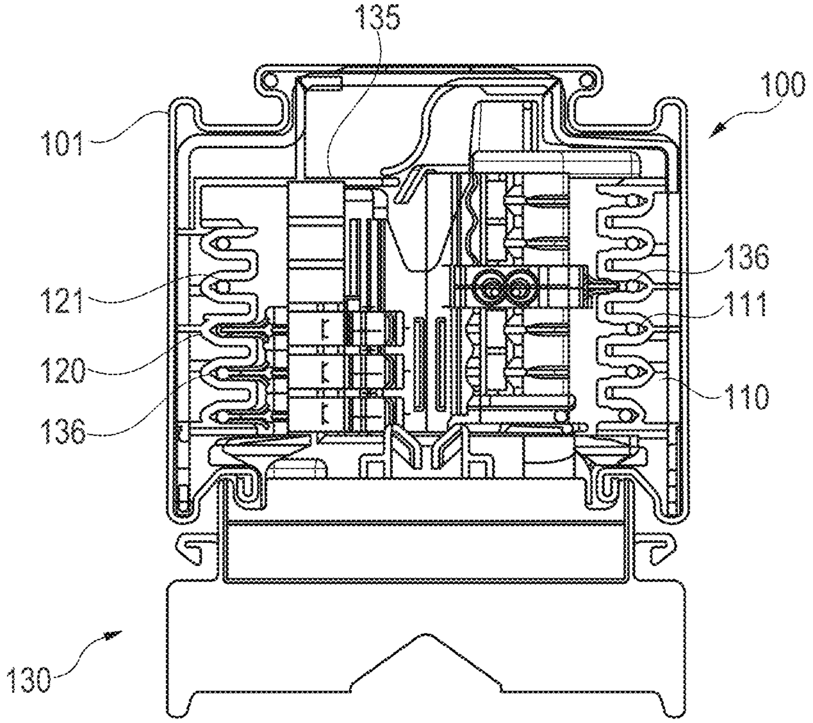
Prior Art Fig. 8
Figure 9:
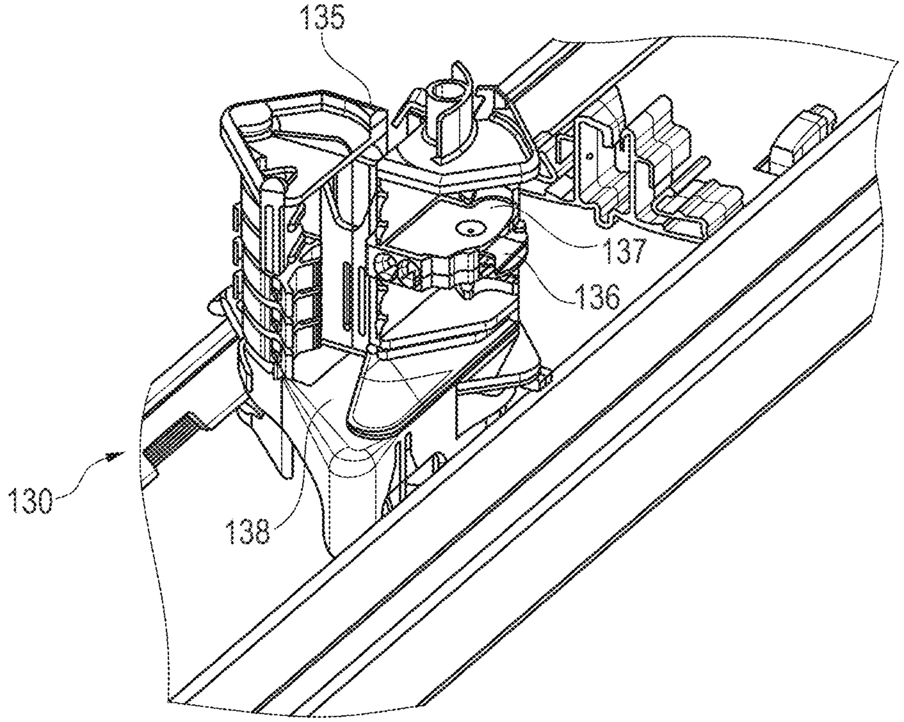
Prior Art Fig. 9

As already mentioned, the present invention constitutes a development of the known "TECTON" system, for example. Before the solution according to the invention is to be described in more detail, the basic design of such a support rail system is therefore to be explained below on the basis of FIGS. 6-9. FIGS. 6 and 7 show views of the mounting rail in which the busbars are arranged. FIGS. 8 and 9, in turn, show the design of a luminaire, connected or to be connected to this mounting rail system, with a contacting element provided for this purpose.

It can be seen here that in this known mounting rail system 100, an elongate mounting profile rail 101, which is U-shaped and opens downward in cross-section, is used, and, together with the two side walls 102 and the upper connecting wall 103, delimits an elongate receiving chamber, which is accessible from the bottom side via an elongate coupling opening. In the case shown, a so-called busbar 110 or 120 (which cannot be seen in FIG. 7, which only shows the mounting profile rail 101) is then respectively arranged on the insides of both side walls 102 and respectively has a plurality of longitudinally running wires or conductors 111, 121 arranged in elongate channels or grooves 113, 123 of a line receiving structure 112, 122 consisting of an insulating material. The channels 113, 123 here ensure a secure mounting of the conductors 111, 121 in such a way that they cannot be accidentally touched. At the same time, however, the channels 113, 123 are respectively designed to be open toward the interior of the mounting profile bar 101 so that contacting of the conductors 111, 121 is made possible.

A luminaire 130 to be connected to this mounting rail system 100 then has at least one rotatably mounted contacting element or tapping element 135, as can be seen in particular in FIGS. 8 and 9. In order to connect the luminaire 130, it is attached from the bottom side to the elongate mounting profile rail 101, wherein the contacting element 135 is inserted into the mounting profile rail 101 via the elongate coupling opening and is subsequently rotated by about 45°. Contacts 136 arranged on the contacting element 135 are here designed to be laterally pivoted outward by the rotation and to then engage, as shown in particular in FIG. 8, in the receiving channels 113, 123 of the two busbars 110, 120 in order to contact the corresponding conductors 111, 121.

In the illustrated case, contacts 136 are arranged on both sides of the contacting element 135 in order to be able to contact the busbars 110, 120 positioned on both side walls 102 of the mounting profile rail 101. In that the contacts 136 can be vertically displaced, with respect to a contact holding body 138 of the tapping element 135, with their associated contact holding part 137 and the cable (not shown) connected thereto, they can be arranged according to the position of a desired conductor 111, 121, in order to then contact this corresponding conductor as desired. On the one hand, this provides the possibility of a phase selection as well as a selection of the neutral conductor for the power supply. However, depending on the number of conductors provided by the busbars 110, 120, the conductors can then also be used for other purposes, such as for communication. This provides the possibility of combining the light units connected to the mounting profile rail 101 into a larger light strip system and of controlling the luminaires centrally from a central control unit.

In addition to the light units shown in the figures, other electrical units can moreover also be connected to the mounting rail system. In this case, sensors, such as presence or brightness sensors, that support automated operation of the lighting system are in particular conceivable here. Units that enable communication or transmission, independent of the lighting controller, of data for other purposes would also be conceivable as meaningful units to be connected to the mounting rail system. Lastly, of course, a wide variety of types of luminaires are also conceivable, which can together be connected to the mounting profile rail and here fulfill different tasks of the lighting technology.

In the system shown and known from the prior art, some of the connecting contacts are positioned at a predetermined height since they are basically to contact a specific conductor of the busbars 110, 120, for example the conductor provided for grounding. However, at least one contact can be positioned height-adjustably on the contacting element 135 since a phase selection for the power supply is to be made via this contact. Depending on the height at which the corresponding connecting contact is located, a different conductor and thus a corresponding phase of the power supply network is contacted, which thus opens the possibility of, for example, assigning luminaires to different groups which are respectively connected to a specific phase of the supply voltage.

Developments of the illustrated mounting rail system have increasingly more conductors since these systems are to fulfill additional tasks in addition to mere lighting and/or the control of the connected luminaires is to be designed to be more flexible and comfortable. For example, it would be conceivable to use two conductors of the busbars for general data transmission, e.g., by means of a PLC, in order to implement a communication network that extends across the area of the entire mounting rail system. That is to say, at specific positions, electrical consumers in the form of routers or so-called access points are connected, which then communicate with a central communication device via the conductors of the busbars on the one hand, and provide an interface for wireless communication with end devices on the other hand. Another option, in turn, is to use two conductors of the busbars for digitally transmitting audio and/or video information. In particular, so-called ELA speakers or other playback devices, which play back the corresponding acoustic information or visual information, could then be connected to the respective conductors at desired positions. Finally, it would also be conceivable to use conductors to implement emergency power supply circuits. Individual luminaires of the system could then be connected to these conductors in order to provide some minimum lighting based on the emergency power supply in case of an emergency state.

In order to be able to use these various functionalities of the system, the corresponding contacting elements of the luminaires or electrical units to be connected must be designed or configured in such a way that they can contact the conductors of the system provided for this purpose, in a desired manner. However, since the conductors of a busbar can be configured differently depending on the wishes of the end user, and thus provide different functionalities, the contacting elements should enable contacting of the conductors of the busbars that is as flexible as possible.

In principle, it would therefore be possible to design all connecting contacts in the manner described above as well as the connecting contact for the phase connection adjustably or in such a way that they can be selectively arranged at different heights on the contacting element. However, this entails the risk that when the connecting contacts are arranged, errors happen and the conductors are contacted in an undesirable manner. Apart from the fact that potentially desired functionalities of the system cannot be used in this case, there is moreover also the risk that, for example, individual components of the units to be connected or of the system as a whole are damaged due to the occurrence of unwanted short circuits, for example.

With the present invention, a solution is provided that at least reduces the problems just described. There is thus greater certainty with regard to the conductors being contacted correctly. At the same time, the effort required to correspondingly arrange the contacts is reduced. This concept according to the invention is to be explained below on the basis of the further figures.

Figure 1:
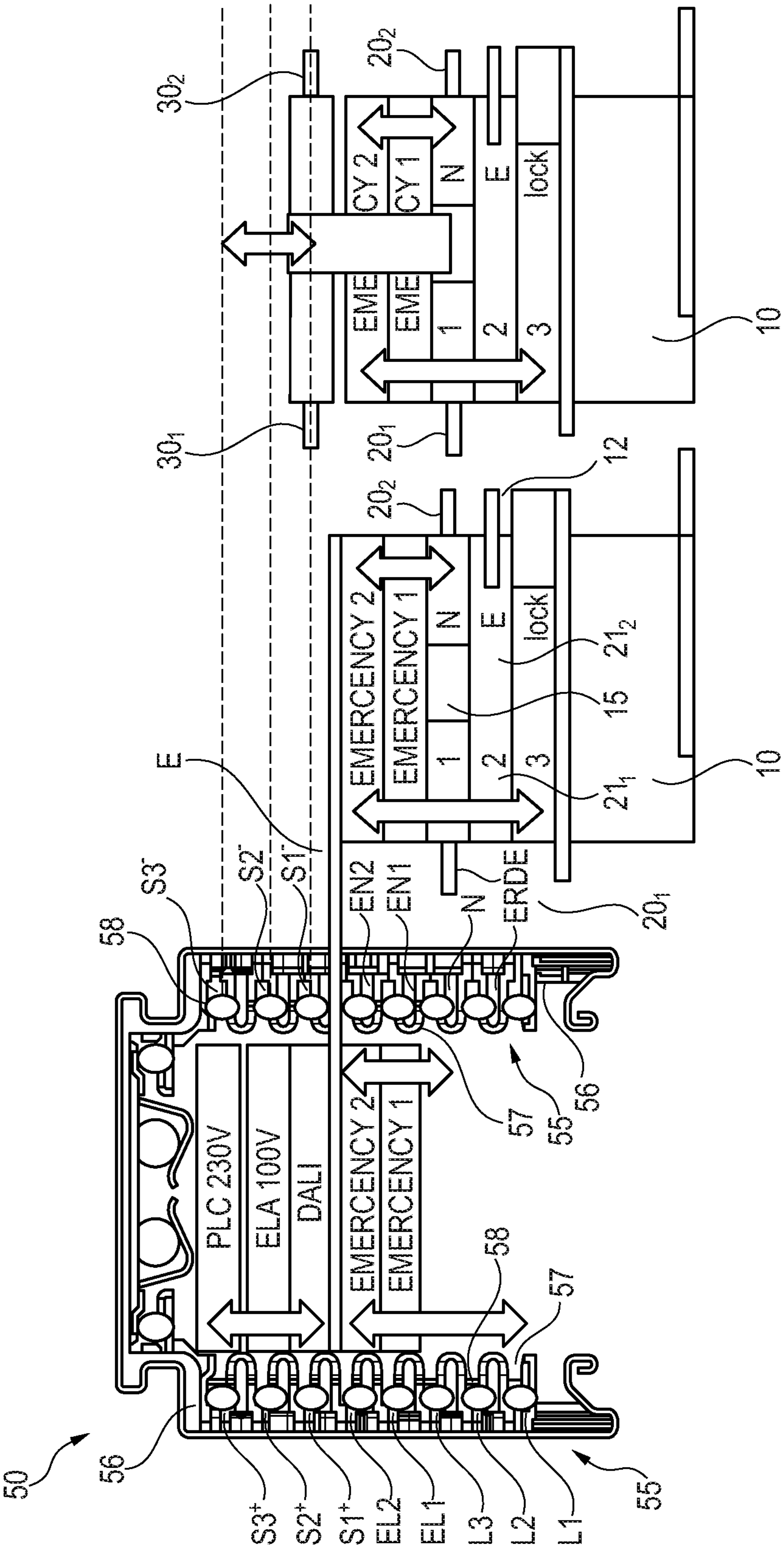
FIG. 1 is a first schematic representation for illustrating the contacting according to the invention with the aid of two paired connecting contacts.

FIG. 1 first illustrates the basic idea of the concept according to the invention. The left side of FIG. 1 shows a cross-section of a mounting rail profile 50 with a plurality of conductors 58 running longitudinally therein, which conductors, like in the prior art, are arranged in longitudinally running grooves or channels 57 of suitably designed, insulating line receiving structures 56 of two busbars 55. The contacting of these conductors 58 is thus generally to take place in the same way as explained using FIGS. 6-9 with the aid of contacting elements, which are inserted, at least partially, into the mounting rail 50 from the bottom side, for example, and are then rotated in such a way that the associated connecting contacts pivot outward and contact the corresponding conductors 58.

In the exemplary embodiment shown in FIG. 1, it is provided that the conductors 58 of the two busbars 55 can be assigned to two basic categories. The conductors 58 below the schematically illustrated plane E primarily serve the power supply of consumers to be connected, in particular of luminaires to be connected, whereas the conductors 58 above the plane E provide additional functions.

In the present case, it is in particular provided that the three lower left conductors L1, L2, L3 form the three phases of a power supply network, whereas the two lower right conductors GND and N allow grounding of connected units on the one hand and constitute the neutral conductor of the power supply network on the other hand. Above these five conductors, conductors EL1, EN1 of a first emergency power supply circuit "EMERCENCY 1" and conductors EL2, EN2 of a second emergency power supply circuit "EMERGENCY 2" then lie opposite one another in pairs in each case.

The additional functions of the system are provided by two conductors 58 opposite one another above level E in each case, wherein a first pair of conductors S1+, S1− forms a DALI bus, via which communication, in particular for lighting control, can thus take place by means of digital signals in accordance with the DALI standard. The overlying pair of conductors S2+, S2− on the other hand forms an ELA-100V circuit, which can in particular be used to transmit acoustic information as well as to connect corresponding speakers. Finally, a further pair of conductors S3+, S3− is available, to which 230V is in turn applied, which can now however be used for communication, independent of the lighting control, via power line carriers. Of course, this configuration of the conductors 58 of the two busbars 55 is merely to be understood as exemplary and it would of course also be conceivable to use the conductors 58 in another way. The conductors of the two emergency power supply circuits could also already be considered as conductors, which already constitute an additional function beyond mere lighting. In other words, the division of the conductors and the two groups mentioned above should also be understood merely as an example in order to explain the idea according to the invention.

In the example shown in FIG. 1, it is useful and advantageous if the connecting contacts used for the power connection can be arranged individually at their height on a corresponding contacting element, wherein this contacting element can basically be designed in the same way as was explained on the basis of FIGS. 8 and 9. This is shown in the middle of FIG. 1, which schematically shows a corresponding contacting element 10 as well as the associated contacts $\mathbf{20}_1$, $\mathbf{20}_2$. The latter can be arranged analogously to the solution known from the prior art, i.e., on corresponding contact holding elements $\mathbf{21}_1$ and $\mathbf{21}_2$, which are arranged in a height-adjustable manner on a contact holding body 15, which can be rotated about a rotational or pivot axis in order to pivot the contacts $\mathbf{20}_1$, $\mathbf{20}_2$ outward.

If a unit to be connected, i.e., a luminaire, for example, is to be connected to the normal power supply lines, the right connecting contact $\mathbf{20}_2$ must be positioned at the height of the neutral conductor N, whereas the left connecting contact $\mathbf{20}_1$ can then be selectively arranged at the height of one of the three lower conductors L1, L2, or L3 in order to assign the luminaire to a specific phase of the power supply. In the event that the luminaire is to contact one of the two emergency power supply circuits, on the other hand, both contacts $\mathbf{20}_1$, $\mathbf{20}_2$ must respectively be arranged at the same height of the conductors EL1, EN1 or EL2, EN2 associated with the corresponding emergency power supply circuit. In addition, the contacting element 10 must of course still have a fixedly positioned connecting contact 12 or a comparable contacting part via which a grounding is secured.

The connecting contacts $\mathbf{20}_1$, $\mathbf{20}_2$ responsible for the power supply should thus each be respectively height-adjustable, but in particular height-adjustable independently of one another, in order to enable a selective connection to one of the three phases of the general power supply network or to one of the two emergency power supply circuits. In any case, it must be ensured here that the two contacts $\mathbf{20}_1$, $\mathbf{20}_2$ are correctly arranged before the luminaire or a different consumer is connected to the system in a corresponding manner.

This is different for the connections for the additional functions of the system. As can be seen in the representation on the left hand side of FIG. 1, it is provided that the respective two associated conductors of an additional function are arranged on the two busbars 55 such that they lie opposite one another in pairs, in particular a fixed relation to one another exists in each case for all three pairs of conductors. In this case, this also applies to the associated connecting contacts, which opens up the possibility of combining two contacts into a group according to the present invention, which group is basically arranged in a jointly adjustable manner on the contacting element 10.

This is shown on the right side of FIG. 1, in which the contacting element 10 shown has a further connecting contact pair $\mathbf{30}_1$, $\mathbf{30}_2$ for the power connection in addition to the two individually adjustable connecting contacts $\mathbf{20}_1$, $\mathbf{20}_2$, said connecting contact pair being arranged opposite one another in the illustrated exemplary embodiment and being basically height-adjustable only together. Depending on which additional function is desired for the luminaire or, in general, the unit to be connected, the connecting contact pair $\mathbf{30}_1$, $\mathbf{30}_2$ can then be height-adjusted in a corresponding manner, wherein the two conductors of the busbars 55, which have been assigned together to a specific additional function, are however basically always contacted. In the illustrated exemplary embodiment, the connecting contact pair $\mathbf{30}_1$, $\mathbf{30}_2$ is in the lowest position so that the conductors S1+ and S1− of the DALI bus are thereby contacted. If, on the other hand, the conductors S3+, S3− are to be contacted for the general data communication, the connecting contact pair $\mathbf{30}_1$, $\mathbf{30}_2$ can be brought into the uppermost position in a single working step, wherein it is ruled out that, accidentally, a connecting contact correctly contacts the corresponding line for the data communication and the second connection remains incorrectly at the height of the DALI conductors. The adaptation of the contacting element 10 of a unit to be connected to the system can thus take place in a much simpler and more reliable manner than would be the case in the case of individually adjustable single contacts.

Figure 2B:
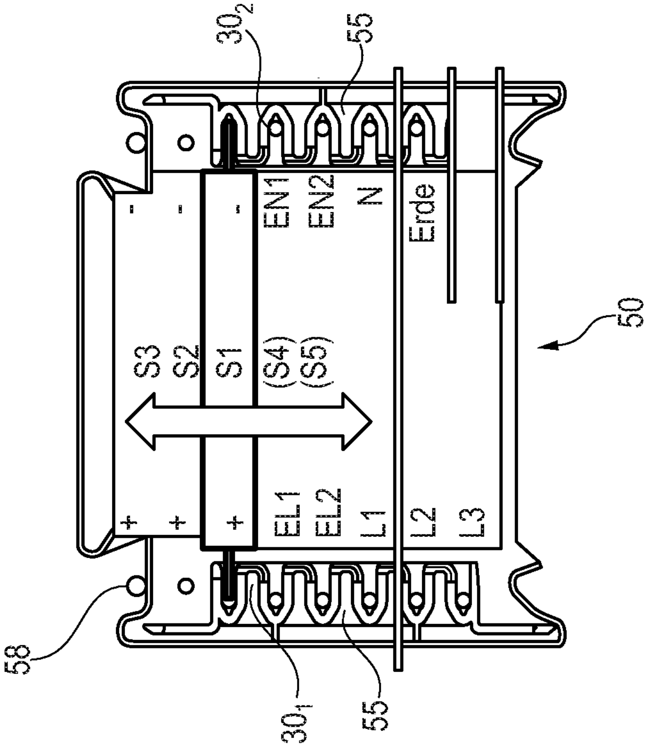
FIGS. 2*a* and 2*b* are schematic representations for comparing the previous procedure for contacting conductors with the procedure according to the invention.
Figure 2A:
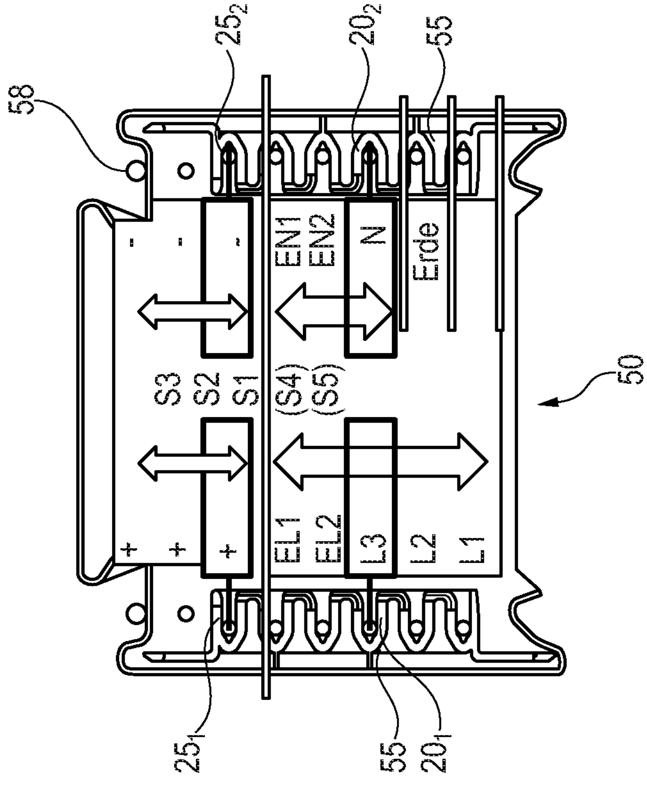

FIGS. 2*a* and 2*b* again illustrate the difference between the previous procedure and the procedure according to the invention. FIG. 2*a* shows a contacting of the busbar conductors 55 in the conventional manner, in which in addition to the two lower connecting contacts $\mathbf{20}_1$, $\mathbf{20}_2$, which are responsible for the power supply to a consumer to be connected, two further contacts $\mathbf{25}_1$, $\mathbf{25}_2$ are used to contact conductors via which an additional function of the system is used. However, both additional contacts $\mathbf{25}_1$, $\mathbf{25}_2$ must again be individually positioned at the appropriate height, wherein in this case, incorrect positioning with respect to one another or with respect to the conductors 58 of the busbars 55 cannot be ruled out.

In contrast, within the framework of a single adjusting process in the solution according to the invention and shown in FIG. 2, the connecting contacts $\mathbf{30}_1$, $\mathbf{30}_2$ combined into a pair can easily be adjusted in their height, wherein the corresponding arrangement of the associated conductors 58 ensure that a pair of conductors belonging together of the busbars is always correctly contacted. In particular, it is excluded that one of the two connecting contacts $\mathbf{30}_1$, $\mathbf{30}_2$ contacts a conductor of a first function, whereas the second connecting contact $\mathbf{30}_1$, $\mathbf{30}_2$, on the other hand, contacts an opposite conductor, offset in height, of a different function.

Figure 3:
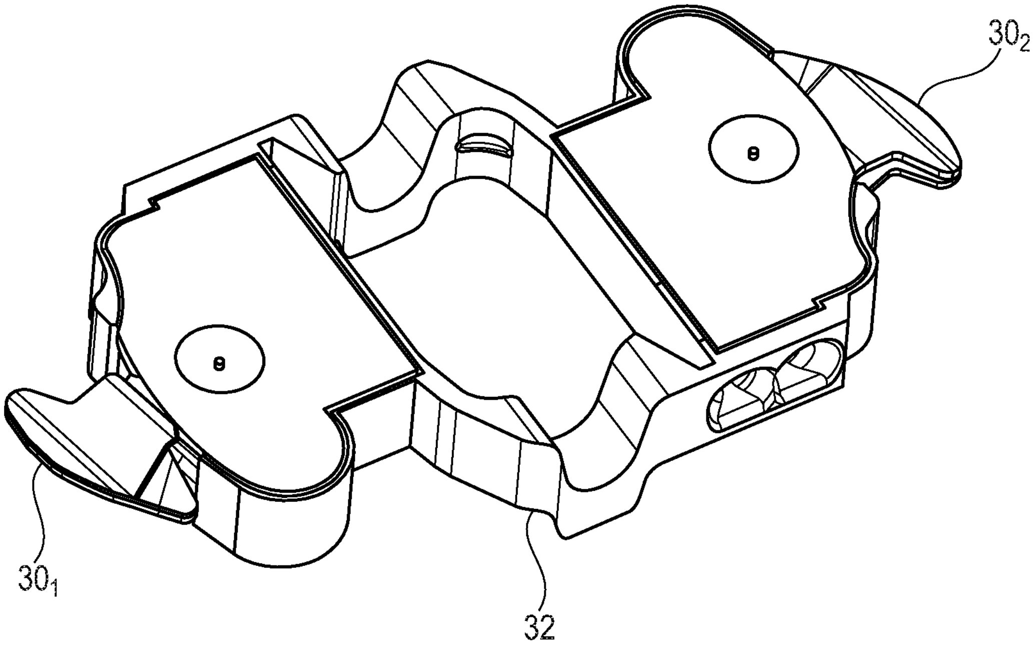
FIG. 3 is an option for implementing the holder according to the invention of two paired connecting contacts.

A simple possibility for the implementation of the solution according to the invention is shown in FIG. 3. Here, a corresponding contact holding part 32 is shown, which oppositely supports the connecting contacts $\mathbf{30}_1$, $\mathbf{30}_2$ combined into a pair. Analogously to a holding part 137 for a single contact, as shown in FIG. 9, this annular contact holding part 32 can also be arranged on the outer circumference of the contact holding body 15 and be displaced to different positions in parallel to its pivot axis. Preferably, the positions available for the connecting contact pair are defined by suitable measures that allow for haptic feedback, e.g., by slightly correspondingly engaging the contact holding part 32 with the contact holding body 15 at the appropriate height positions. Analogously to the single contacts $\mathbf{20}_1$, $\mathbf{20}_2$, the contacts $\mathbf{30}_1$, $\mathbf{30}_2$ of the pair are then also in this case arranged opposite one another on the outer circumference of the contact holding body 15, now in a common plane aligned perpendicularly to the pivot axis of the contact holding body 15, in such a way that when the contact holding body 15 is rotated, they can be laterally pivoted outward by, for example, 45° in such a way that they engage in the grooves 57 of the corresponding busbars 55 and then contact the associated conductors.

However, it should be noted that the variant shown in FIG. 3 only represents a conceivable possibility of easily forming a contact group according to the invention, the contacts of which are basically arranged in the same relation to one another. In particular, it does not necessarily have to be provided that both connecting contacts of a group are arranged at identical height with respect to the contacting element, but rather it would basically also be conceivable that they are arranged at an offset from one another in height and, if necessary, even both are arranged on one side of the contacting element and thus contact corresponding conductors of a busbar in the same direction. However, it is important that the arrangement and configuration of the conductors of the busbar(s) then takes place analogously to the fixedly predetermined relative arrangement of the connecting contact pair, wherein, of course, the variant explained on the basis of FIGS. 1-3 represents the solution that can be implemented most easily.

It should further be noted that, as an alternative to rotating the contacting element, different mechanisms would also be conceivable by which the connecting contacts can be transferred from an open position to a contacting position in order to contact conductors of one or more busbars. In particular, linear displacements of a corresponding contact holding body would also be conceivable here. In this case, too, a plurality of contacts can be combined into a group in the sense of the present invention in order to simplify contacting the conductors.

In the exemplary embodiment described so far, the contacting element 10 had a group, designed according to the invention, of two paired connecting contacts $\mathbf{30}_1$, $\mathbf{30}_2$ as well as two further individually adjustable connecting contacts $\mathbf{20}_1$, $\mathbf{20}_2$ via which a connection to the power supply conductors of the system was made. Here, too, there are, of course, possibilities for variation, wherein individual contacts can, for example, also be provided in a fixedly predetermined position, i.e., not adjustably, on the contacting element. Furthermore, a contacting element designed according to the invention can of course also have a plurality of connecting contact pairs or connecting contact groups, which are adjustable in the manner according to the invention in such a way that the connecting contacts of a group can always only be arranged with respect to the contact holding body 15 in a fixed relation to one another.

Figures 4A, 4B, 4C, 4D:
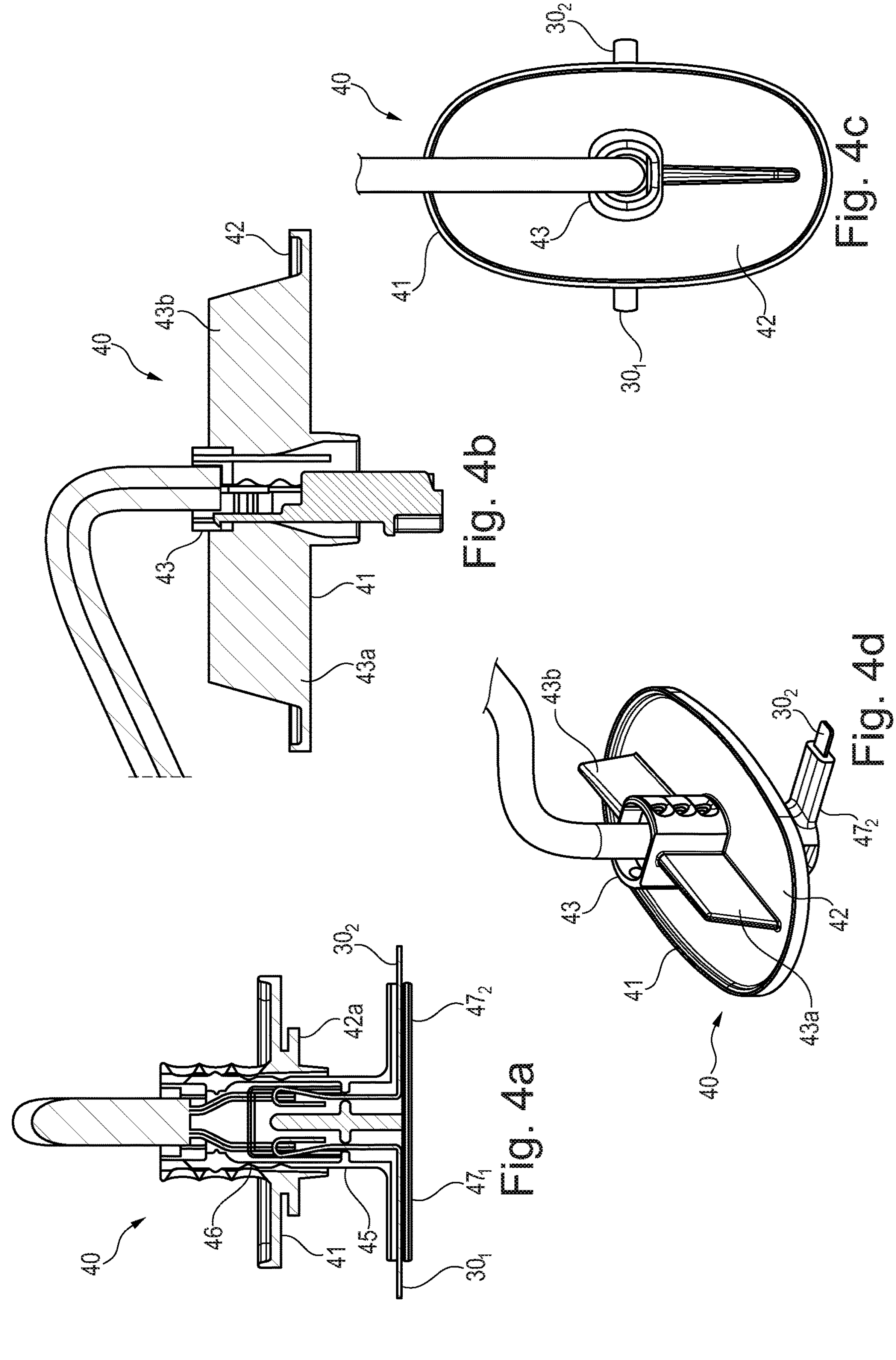
FIGS. 4*a*-4*d* are views of a possible exemplary embodiment of a contacting element according to the invention with two paired connecting contacts.

Finally, it would also be conceivable to design a contacting element according to the invention in such a way that it has exclusively connecting contacts adjustable as a group, in particular only a single connecting contact pair combined according to the invention into a group. A corresponding exemplary embodiment in this respect is shown in FIGS. 4 and 5 and is explained below.

The special feature of the contacting element 40 shown in FIGS. 4 and 5 is that it is not, as discussed so far, inserted from the bottom side into a mounting rail profile and subsequently rotated in order to contact the conductors of the busbar(s) but instead engages in the mounting rail via an opening provided at the top of the mounting rail profile. With the help of the contacting element 40 discussed below, consumers that are not arranged like traditional light strip lights on the bottom side of the mounting rail profile but instead positioned on the outside or top of the mounting rail profile and fulfill additional functions here are thus, for example, connected to the conductors of the busbar(s).

The contacting element shown in FIGS. 4*a*-4*d* comprises a base element 41, which in turn initially forms a contact holding body 15 that can be rotated with respect to the mounting rail profile. This base element 41 is substantially formed by an oval plate 42, which in the assembled state then rests at least with its edge region at the top of the mounting rail profile 50 on the circumferential region of the opening not shown in the figures. A cylindrical projection 43 from which the connection cable connected to the connecting contacts $\mathbf{30}_1$, $\mathbf{30}_2$ projects extends centrally toward the top. Provided on both sides of this cylindrical projection 43 are bar-like wings 43*a*, 43*b*, which in the form of handles facilitate the rotating of the base element 41.

The cylindrical projection 43 continues in the form of a hollow cylinder on the bottom side of the oval plate 42 so that a hollow cylindrical receptacle is formed in which a height-adjustable contact holding part 45 engages. This contact holding part 45 consisting of an insulating material initially forms a vertically aligned, in turn cylindrical projection 46 that engages in the receptacle of the base body 41. On this outside of this projection 46, outward projecting annular projections may be provided, which correspond to corresponding annular recesses on the inside of the cylindrical receptacle of the base body 41, thereby defining latching positions that define different preferred height positions for the contact holding part 45. At the bottom side of the contact holding part 45, two laterally projecting, holders $\mathbf{47}_1$ and $\mathbf{47}_2$ pointing in opposite directions are formed, said holders then supporting the actual pin-type connecting contacts $\mathbf{30}_1$ and $\mathbf{30}_2$, respectively. The latter are coupled to the end region of the connecting cable via internally running conductors.

Figure 5C:
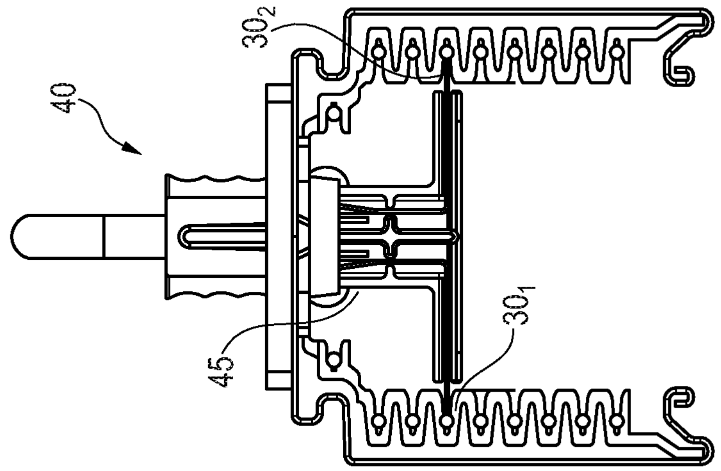
FIGS. 5*a*-5*c* are views of the contacting element connected to a mounting rail according to FIG. 4, when contacting different pairs of conductors.
Figure 5B:
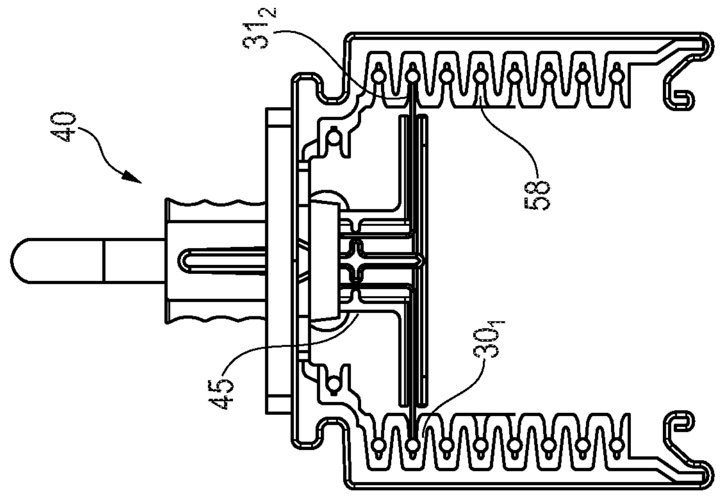
Figure 5A:
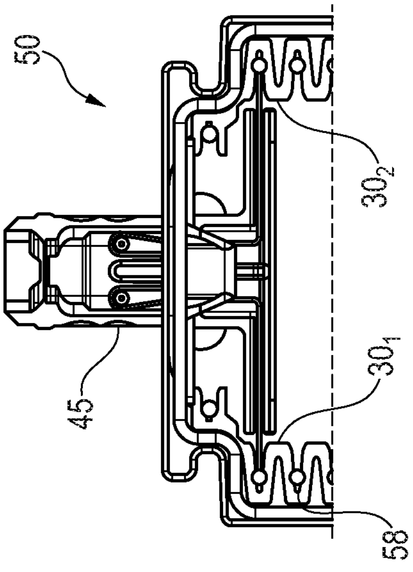

If a consumer is now to be connected to the conductors of a mounting rail profile with the aid of the contacting element 40 shown, a first step is to bring the contact holding part 45 in the receptacle of the base part 41 to a desired position, which corresponds to one of the predetermined latching positions. The connecting contacts $\mathbf{30}_1$ and $\mathbf{30}_2$ are thus at a fixedly predetermined height with respect to the bottom side of the oval plate 42 of the base part 41. Subsequently, the contacting element 40 is attached from the top to the mounting rail profile, wherein the initially longitudinally aligned connecting contacts $\mathbf{30}_1$, $\mathbf{30}_2$ with the lower region of the contact holding part 45 penetrate the opening (not shown in the figures) at the top of the mounting rail profile 50. If the oval plate 42 with its bottom side lies on the top of the mounting rail profile 50, a rotation takes place by 90°, wherein the contacts $\mathbf{30}_1$, $\mathbf{30}_2$ are then pivoted laterally outward in order to contact the associated conductors. This is shown in FIGS. 5*a* to 5*c* (only the contact holding part 45 but not the base part 41 being shown in FIG. 5*a*) for three different latching positions of the contact holding part 45, each corresponding to different pairs of conductors to be contacted. At the same time, laterally extending bars 42*a* provided below the oval plate 42 can be used to mechanically lock the contacting element 40 to the mounting rail profile 50.

In this case, too, by simply adjusting the contact holding part 45 with respect to the base part 41 or contact holding body 15, the position of the paired contacts $\mathbf{30}_1$, $\mathbf{30}_2$ can be selected in such a way that they always correctly contact two associated conductors of the busbar(s) of the system. Incorrect contacting is thus largely excluded. The illustrated embodiment thus represents a particularly simple and elegant variant of connecting additional consumers to the system and at the same time ensuring that the respectively correct conductors are contacted.

It should furthermore be noted that the procedure explained on the basis of FIGS. 4 and 5 for implementing jointly adjustable connecting contacts can of course also be used for contacting elements that are attached from the bottom side to the mounting rail profile. That is to say, the contact holding part 45 discussed above could be used identically, wherein the contact holding body 15, which could be embodied in a comparable manner as the prior-art contact holding body shown in FIG. 9, in turn has, at its upper region, a cylindrical receptacle, which allows the arrangement, preferably latchable arrangement, of the contact holding part 45 at different heights. In particular, it could even be provided here that the contacting element 10 is designed in such a way that it initially only has, on the contact holding body 15, the base connecting contacts that are required for connection to the power supply conductors and which are positioned and/or individually positionable at fixed predetermined positions. However, if an additional function of the system is to be used, the contact holding part 45 just described could be arranged in the form of an additional adapter on the top of the contacting element 10 in order to enable the contacting of further conductors.

Overall, the solution according to the invention thus helps to further optimize the versatile contacting of conductors of busbars of a mounting rail profile.

The invention claimed is:

1. A contacting element (10) for connecting a luminaire or an electrical unit to a mounting rail, which has a mounting rail profile (50) with at least one busbar (55), arranged therein, with electrically contactable conductors (58), wherein the contacting element (10) comprises a plurality of connecting contacts ($\mathbf{20}_1$, $\mathbf{20}_2$, $\mathbf{30}_1$, $\mathbf{30}_2$), said contacting element being adjustable between an open position, in which at least a partial insertion and removal of the contacting element (10) from the mounting rail profile (50) is made possible, and a contacting position, in which the connecting contacts ($\mathbf{20}_1$, $\mathbf{20}_2$, $\mathbf{30}_1$, $\mathbf{30}_2$) contact the conductors (58) of the busbar(s) (55), and wherein multiple connecting contacts ($\mathbf{20}_1$, $\mathbf{20}_2$, $\mathbf{30}_1$, $\mathbf{30}_2$) are arranged adjustably on the contacting element (10), wherein at least two of the connecting contacts ($\mathbf{20}_1$, $\mathbf{20}_2$) on the contacting element (10) are combined in a first group and are independently adjustable and an additional at least two of the connecting contacts ($\mathbf{30}_1$, $\mathbf{30}_2$) on the contacting element (10) are combined into a second group and mounted on the contacting element (10) in such a way that they are only adjustable with respect to the contacting element (10) in a fixed relation to one another;

wherein the contacting element (10) has a contact holding body (15) comprising the first group of connecting contacts ($\mathbf{20}_1$, $\mathbf{20}_2$) that are independently adjustable; and the second group of connecting contacts ($\mathbf{30}_1$, $\mathbf{30}_2$) are mounted to the contact holding body (15) in such a way that they are only adjustable with respect to the contact holding body (15) in a fixed relation to one another.

2. The contacting element according to claim 1, wherein the contacting element (10) has a plurality of groups of connecting contacts ($\mathbf{20}_1$, $\mathbf{20}_2$) that are independently adjustable.

3. The contacting element according to claim 2, wherein the plurality of groups of connecting contacts ($\mathbf{20}_1$, $\mathbf{20}_2$) that are independently adjustable are on the contact holding body.

4. The contacting element according to claim 3, wherein the contact holding body (15) is rotatable about a pivot axis and the connecting contacts ($\mathbf{20}_1$, $\mathbf{20}_2$, $\mathbf{30}_1$, $\mathbf{30}_2$) are arranged on the contact holding body (15) in such a way that the connecting contacts ($\mathbf{20}_1$, $\mathbf{20}_2$, $\mathbf{30}_1$, $\mathbf{30}_2$) are pivoted outward by rotating the contact holding body (15) and are brought into abutment against the conductors (58) to be contacted.

5. The contacting element according to claim 4, wherein the adjustable connecting contacts ($\mathbf{20}_1$, $\mathbf{20}_2$, $\mathbf{30}_1$, $\mathbf{30}_2$) are displaceably mounted on the contact holding body (15) in parallel to the pivot axis thereof.

6. The contacting element according to claim 4, wherein the two connecting contacts ($\mathbf{30}_1$, $\mathbf{30}_2$) of the second group are arranged opposite one another with respect to the pivot axis, substantially in a common plane aligned perpendicularly to the pivot axis, and are displaceable between two or three different positions defined by haptic feedback.

7. The contacting element according to claim 4, wherein the connecting contacts ($\mathbf{20}_1$, $\mathbf{20}_2$, $\mathbf{30}_1$, $\mathbf{30}_2$) are arranged adjustably on the outer circumference of the contact holding body (15).

8. The contacting element according to claim 4, wherein the connecting contacts ($\mathbf{30}_1$, $\mathbf{30}_2$) of the second group are arranged on an annular contact holding part (32), which is displaceably arranged on the outer circumference of the contact holding body (15) and is displaceable to different positions in parallel to the pivot axis.

9. The contacting element according to claim 6, wherein the connecting contacts ($\mathbf{30}_1$, $\mathbf{30}_2$) of the second group are arranged on an adapter that can be attached to the contact holding body (15).

10. The contacting element according to claim 9, wherein the connecting contacts ($\mathbf{30}_1$, $\mathbf{30}_2$) are fixedly arranged on the adapter, and the adapter is arranged adjustably on the contact holding body (15) corresponding to said two or three different positions defined by haptic feedback.

11. The contacting element according to claim 8, wherein the different positions for the contact holding part (32) are defined on the contact holding body (15).

12. A luminaire or electrical unit for connecting to a mounting rail, which has a mounting rail profile (50) with at least one busbar (55), arranged therein, with electrically contactable conductors (58), wherein the luminaire or electrical unit has a contacting element (10, 40) according to claim 1.

13. A mounting rail system enabling the mounting and electrically connection of a luminaire and the electrical connection of an auxiliary electrical unit to a mounting rail profile, the mounting rail system comprising:

an elongated U-shaped mounting rail profile having a first sidewall, a second sidewall and a top wall spanning between the top portions of the first and second sidewalls, wherein the elongated U-shaped mounting rail profile has an opening between the sidewalls from below through which a luminaire contacting element is inserted to mount and install the luminaire;

a first busbar arranged on the first sidewall and a second busbar on the second sidewall, each busbar having electrically insulated longitudinal channels holding electrically contactable conductors;

an auxiliary contacting element (40) configured to be mounted through an opening in the top wall of the mounting rail profile, said auxiliary contacting element (40) comprising:

a connection cable having a first wire and a second wire for electrically connecting the auxiliary electrical unit;

a base plate that mounts physically to the top wall of the mounting rail profile around the opening of through the top wall, said base plate including means to mount the auxiliary contacting element to the top wall of the mounting rail by rotating the base plate about a pivot axis;

a hollow projection fixed to the base plate, passing perpendicularly through the base plate around the pivot axis and extending above and below the base plate, wherein the connection cable feeds into the hollow projection above the base plate;

a contact holding element having a stem, a first laterally extending contact holder and a second laterally extending contact holder extending from the stem in the opposite direction as the first laterally extending contact holder, wherein the stem resides at least partially with the hollow projection and is able to move vertically relative to the hollow projection but does not rotate with respect to the hollow projection;

a first electrical connecting contact ($30_1$) connected to the first wire in the connection cable and held at least in part by the first laterally extending contact holder, and a second electrical connecting contact ($30_2$) connected to the second wire in the connection cable held at least in part by the second laterally extending contact holder such that the first and second electrical connecting contacts are aligned perpendicularly to the pivot axis and at an appropriate radial distance so that the first electrical connecting contact ($30_1$) electrically contacts an electrically contactable conductor in the first busbar and the second electrical connecting contact ($30_2$) electrically contacts an electrically contactable conductor in the second busbar when the auxiliary contacting element (40) is fully mounted through the opening in the top wall of the mounting rail profile and rotated to make the electrical connections; and means for adjustably latching the position of the contact holding element vertically along the pivot axis from the base plate between two or three predetermined positions defined by haptic feedback so that the position of the first and second electrical contacting elements is adjustable with respect to the base plate and further that the adjusted position coincides with the position of a selected pair of electrically contactable conductors in the first and second busbars.

14. The mounting rail system in claim 13 wherein the auxiliary contacting element (40) further comprises wings on a top of the base plate extending from the hollow protection.

15. The mounting rail system in claim 13 wherein the luminaire contacting element comprises:

a plurality of connecting contacts ($20_1$, $20_2$, $30_1$, $30_2$), said luminaire contacting element being adjustable between an open position, in which at least a partial insertion into and removal of the luminaire contacting element (10) from the mounting rail profile (50) is made possible, and a contacting position, in which the connecting contacts ($20_1$, $20_2$, $30_1$, $30_2$) contact the conductors (58) of the busbar(s) (55);

wherein the multiple connecting contacts ($20_1$, $20_2$, $30_1$, $30_2$) are arranged adjustably on the luminaire contacting element (10), and at least two of the connecting contacts ($20_1$, $20_2$) on the luminaire contacting element (10) are combined in a first group and are independently adjustable and an additional at least two of the connecting contacts ($30_1$, $30_2$) on the luminaire contacting element (10) are combined into a second group and mounted on the luminaire contacting element (10) in such a way that they are only adjustable with respect to the luminaire contacting element (10) in a fixed relation to one another; and wherein the luminaire contacting element (10) has a contact holding body (15) comprising the first group of connecting contacts ($20_1$, $20_2$) that are independently adjustable, and the second group of connecting contacts ($30_1$, $30_2$) are mounted to the contact holding body (15) in such a way that they are only adjustable with respect to the contact holding body (15) in a fixed relation to one another.

* * * * *